US008724726B2

(12) United States Patent
Park et al.

(10) Patent No.: US 8,724,726 B2
(45) Date of Patent: May 13, 2014

(54) AUTOMATIC GAIN CONTROL APPARATUS AND METHOD FOR COMPRESSED MODE IN MIMO SYSTEM

(75) Inventors: Hung-Su Park, Suwon-si (KR); Shin-Woo Kang, Suwon-si (KR); Soo-Bok Yeo, Suwon-si (KR); Ki-Hwan Jeon, Suwon-si (KR); Joo-Kwang Kim, Yongin-si (KR); Sung-Chul Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 905 days.

(21) Appl. No.: 12/607,626

(22) Filed: Oct. 28, 2009

(65) Prior Publication Data
US 2010/0104052 A1 Apr. 29, 2010

(30) Foreign Application Priority Data
Oct. 28, 2008 (KR) ........................ 10-2008-0105623

(51) Int. Cl.
*H04B 7/02* (2006.01)

(52) U.S. Cl.
USPC .......................................... 375/267; 375/345

(58) Field of Classification Search
CPC .... H04B 1/707; H04B 1/7115; H04B 7/0854; H04L 1/0618; H04L 1/06; H03G 3/3052; H03G 3/3068
USPC ............ 375/145, 147, 148, 267, 26; 370/355; 455/63.1
See application file for complete search history.

(56) References Cited

U.S. PATENT DOCUMENTS

| | | | |
|---|---|---|---|
| 6,078,796 A * | 6/2000 | Ling | 455/234.1 |
| 6,111,911 A * | 8/2000 | Sanderford et al. | 375/147 |
| 6,333,926 B1 * | 12/2001 | Van Heeswyk et al. | 370/335 |
| 6,836,506 B2 * | 12/2004 | Anderson | 375/145 |
| 6,944,427 B2 * | 9/2005 | Haub et al. | 455/63.1 |
| 7,307,480 B2 * | 12/2007 | Shiu et al. | 331/44 |
| 7,463,704 B1 * | 12/2008 | Tehrani et al. | 375/345 |
| 7,933,314 B2 * | 4/2011 | Lindoff | 375/148 |
| 2004/0223539 A1 * | 11/2004 | Yang | 375/148 |

FOREIGN PATENT DOCUMENTS

| KR | 10-2003-0029406 A | 4/2003 |
|---|---|---|
| KR | 10-0690438 B1 | 3/2007 |
| KR | 10-2008-0050192 A | 6/2008 |

\* cited by examiner

*Primary Examiner* — Daniel Washburn
*Assistant Examiner* — Fitwi Hailegiorgis
(74) *Attorney, Agent, or Firm* — Jefferson IP Law, LLP (57) ABSTRACT

An automatic gain control apparatus and method for a compressed mode in a MIMO system are provided. The method includes determining power at a first frequency band using a first receiver, simultaneously determining power at a second frequency band using a second receiver in a compressed mode, if the second receiver changes a power determination frequency band into the first frequency band, correcting the power determination value of the first receiver, and applying the corrected power determination value of the first receiver to the second receiver.

16 Claims, 7 Drawing Sheets

AUTOMATIC GAIN CONTROL APPARATUS AND METHOD FOR COMPRESSED MODE IN MIMO SYSTEM

PRIORITY

This application claims the benefit under 35 U.S.C. §119 (a) of a Korean patent application filed in the Korean Intellectual Property Office on Oct. 28, 2008 and assigned Serial No. 10-2008-0105623, the entire disclosure of which is hereby incorporated by reference.

BACKGROUND OF THE INVENTION

1. Field of the Invention

The present invention relates to an automatic gain control apparatus and method. More particularly, the present invention relates to an automatic gain control apparatus and method for a compressed mode in a High-Speed Packet Access (HSPA) system supporting Multiple Input Multiple Output (MIMO).

2. Description of the Related Art

Mobile communication systems are evolving into high-speed and high-quality wireless packet data communication systems for data services and multimedia services. High-Speed Packet Access (HSPA) has been developed to support a high-speed and high-quality wireless packet data transmission service. The HSPA introduces a Multiple Input Multiple Output (MIMO) technology that uses a multiple transmission/reception antenna. The MIMO is a technology for simultaneously transmitting a plurality of data streams through a same resource, using the multiple transmission/reception antenna.

A basic Universal Mobile Telecommunications System (UMTS) supports a compressed mode for determining signal states of several neighbor cells consistently, in order to determine a target cell. In the UMTS system, a Transmission Gap (TG) denotes a Discontinuous Transmission (DTX) gap caused by the compressed mode. During the DTX gap, a Radio Frequency (RF) of a terminal shifts to a frequency band of a cell intended for determination, and performs diverse forms determinations required by an upper layer of the UMTS.

Accordingly, a receiver supporting MIMO supports antenna diversity. That is, the receiver determines power of an input signal from an antenna path and performs Automatic Gain Control (AGC).

Figure 1:
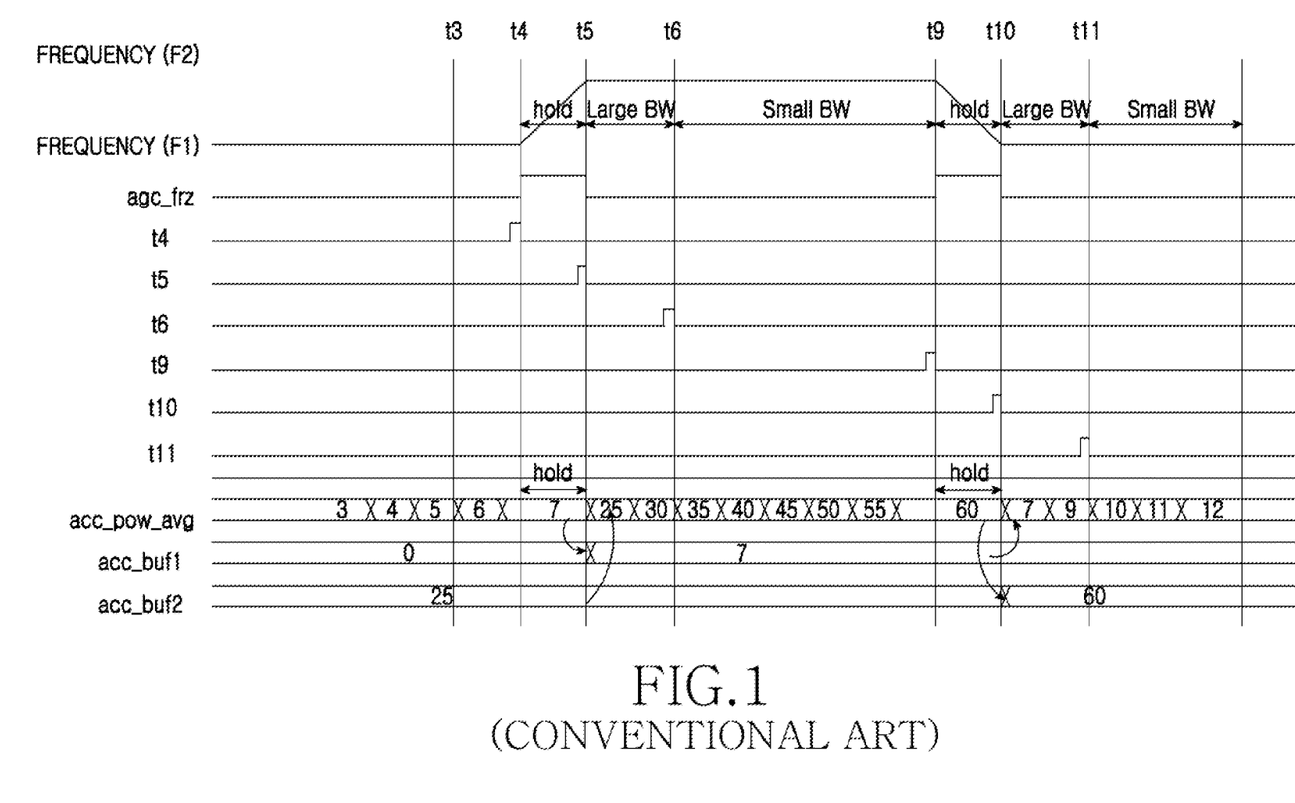
FIG. 1 is a diagram illustrating a conventional operation process of a High-Speed Packet Access (HSPA) receiver supporting Multiple Input Multiple Output (MIMO)

FIG. 1 is a diagram illustrating a conventional operation process of an HSPA receiver supporting MIMO.

Referring to FIG. 1, if an inter-frequency determination signal is received, at time 't4', the receiver stores a previously accumulated power level of a received signal in a buffer and completes a shift to a different frequency. At time 't5' when a frequency synthesizer converges, an accumulator receives a new power level and initiates an accumulating operation.

The receiver then sets a large gain constant to increase a BandWidth (BW) of a loop. At time 't6' after the lapse of a constant time, the receiver decreases the gain constant, decreases the BW and determines a power level of a received signal.

The receiver then completes inter-frequency determination and, at time 't9', stores an accumulated value in a new buffer. At this time, during a return to an original frequency, the accumulator maintains a 'hold'.

At time 't10' when a frequency shift to the original frequency is completed, the receiver increases the gain constant again, increases the BW and at time 't11', after the lapse of a constant time, decreases the gain constant again and decreases the BW.

Figure 2:
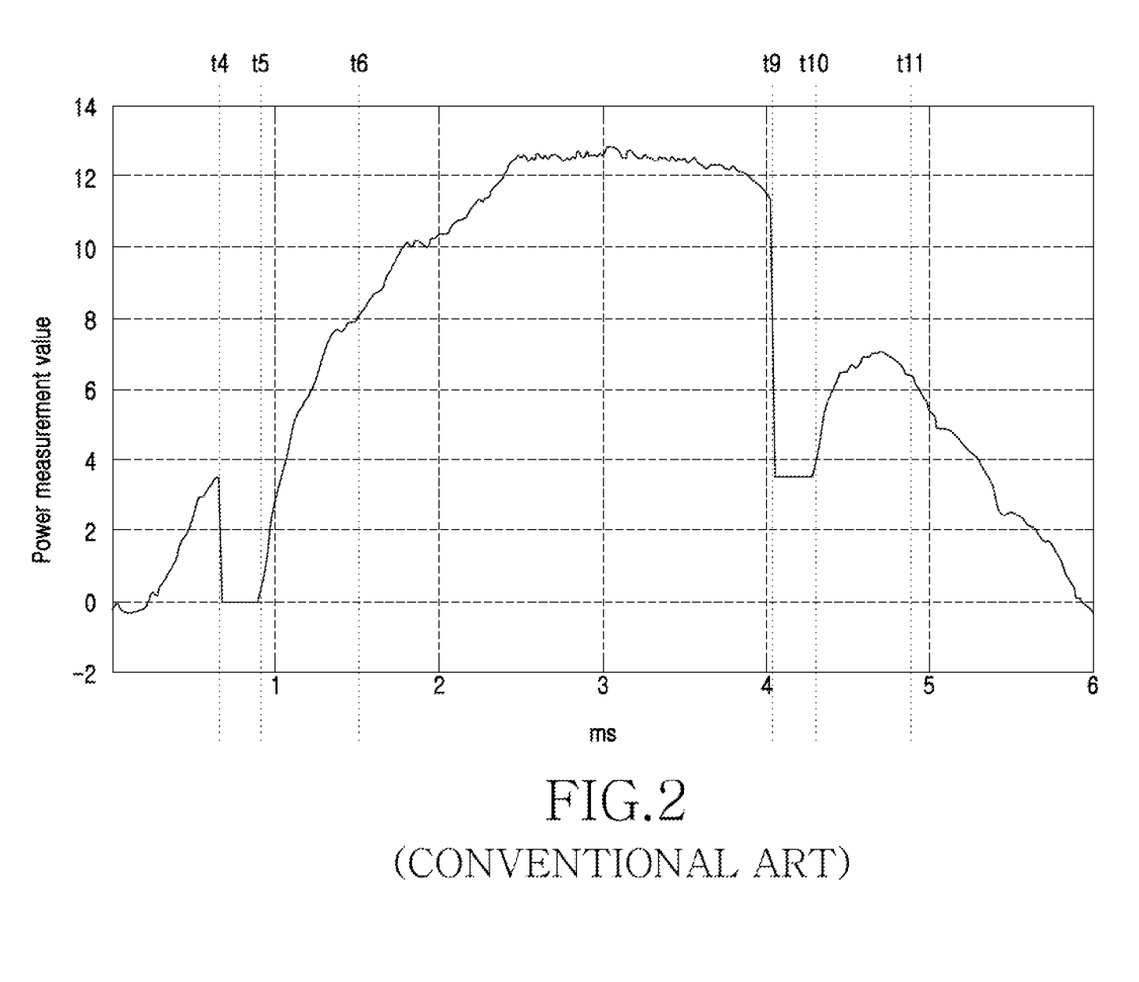
FIG. 2 is a graph illustrating a conventional Automatic Gain Control (AGC) simulation result of an HSPA receiver supporting MIMO.

FIG. 2 is a graph illustrating a conventional AGC simulation result of an HSPA receiver supporting MIMO.

In FIG. 2, it is appreciated that a power determination value operates with a large BW at time 't10' and follows up to a current receive power. Up to time 't11', the receiver has a stabilization time, and after time 't11', a searcher and a rake initiate an operation.

At the time of a return to the original frequency after the inter-frequency determination, a receive signal power level of an accumulator of a 'hold' state is in an intactly accumulated state. Thus, returning to a signal intensity of a reference power level takes a long time.

Although the TG is generated due to the compressed mode, problems occur if data transmission/reception is discontinued or performance is deteriorated. Thus, in some cases, a transmission side may perform power compensation for a frame corresponding to the compressed mode.

In this case, there may be an increase or decrease of a receive power within a range of 2 dB to 3 dB (least) to 9 dB (worst). Further, in the case of Wideband Code Division Multiple Access (W-CDMA), the TG can have a period of a minimum of 3 slots. If the TG is over a frame, the TG can have a period of a maximum of 14 slots.

If the terminal moves at high speed during this period, a variation of power with a Base Station (BS) may increase. In order to make up for the increase, a method for quickly converging a receiving AGC (RX_AGC) and matching a reference power with a power level may be used, by increasing a gain constant and a BW. However, in this case, the converging into the reference power takes a long time.

Therefore, a need exists for an AGC apparatus and method in a MIMO system for reducing a search time in a compressed mode operation.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for a compressed mode in a Multiple Input Multiple Output (MIMO) system.

Another aspect of the present invention is to provide an automatic gain control apparatus and method for reducing a search time using two antennas in a High-Speed Packet Access (HSPA) system supporting MIMO, upon a compressed mode operation.

In accordance with an aspect of the present invention, a method for Automatic Gain Control (AGC) during a compressed mode search in a MIMO system is provided. The method includes determining power at a first frequency band using a first receiver, simultaneously determining power at a second frequency band using a second receiver in a compressed mode, if the second receiver changes a power determination frequency band into the first frequency band, correcting the power determination value of the first receiver, and applying the corrected power determination value of the first receiver to the second receiver.

In accordance with another aspect of the present invention, an apparatus for AGC during a compressed mode search in a MIMO system is provided. The apparatus includes a first receiver, a second receiver, and a channel comparator. The first receiver determines power at a first frequency band. The second receiver, in a compressed mode, simultaneously determines power at a second frequency band. If the second receiver changes a power determination frequency band into the first frequency band, the channel comparator corrects the power determination value of the first receiver and applies the corrected power determination value of the first receiver to the second receiver.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, determination error, determination accuracy limitations and other factors known to skill in the art, may occur in amounts that do not preclude the effect the characteristic was intended to provide.

Exemplary embodiments of the present invention provide an automatic gain control apparatus and method for a compressed mode in a Multiple Input Multiple Output (MIMO) system.

Upon a compressed mode operation in a receiver, shifts to different frequencies for two paths are insignificant due to a problem with a searcher memory capacity.

Thus, upon a power determination operation in a compressed mode, one antenna performs the power determination operation in the compressed mode, and another antenna maintains Automatic Gain Control (AGC) at an existing frequency band (F1) while determining a power variation.

Figure 3:
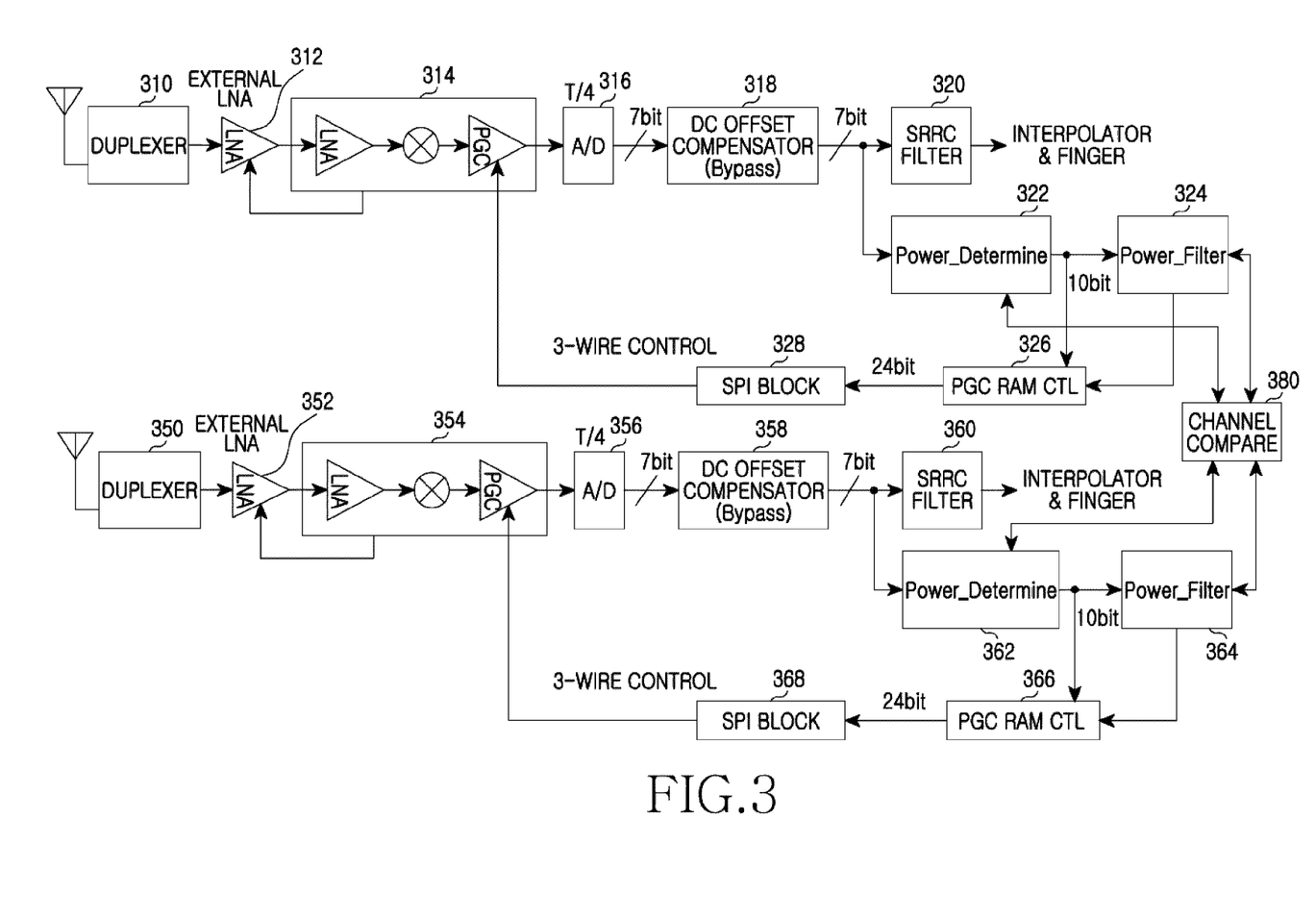
FIG. 3 is a block diagram illustrating an HSPA receiver supporting MIMO according to an exemplary embodiment of the present invention.

FIG. 3 is a block diagram illustrating a High-Speed Packet Access (HSPA) receiver supporting MIMO according to an exemplary embodiment of the present invention.

Referring to FIG. 3, the HSPA receiver includes conventional elements 310 to 328 and 350 to 368. In an exemplary implementation, the HSPA receiver includes a Channel Compare unit 380.

Among elements 310 to 328 and 350 to 368, Power_Determine units 322 and 362 determine power of each antenna path and Power_Filter units 324 and 364 filter output values provided from the Power_Determine units 322 and 362.

Figure 4:
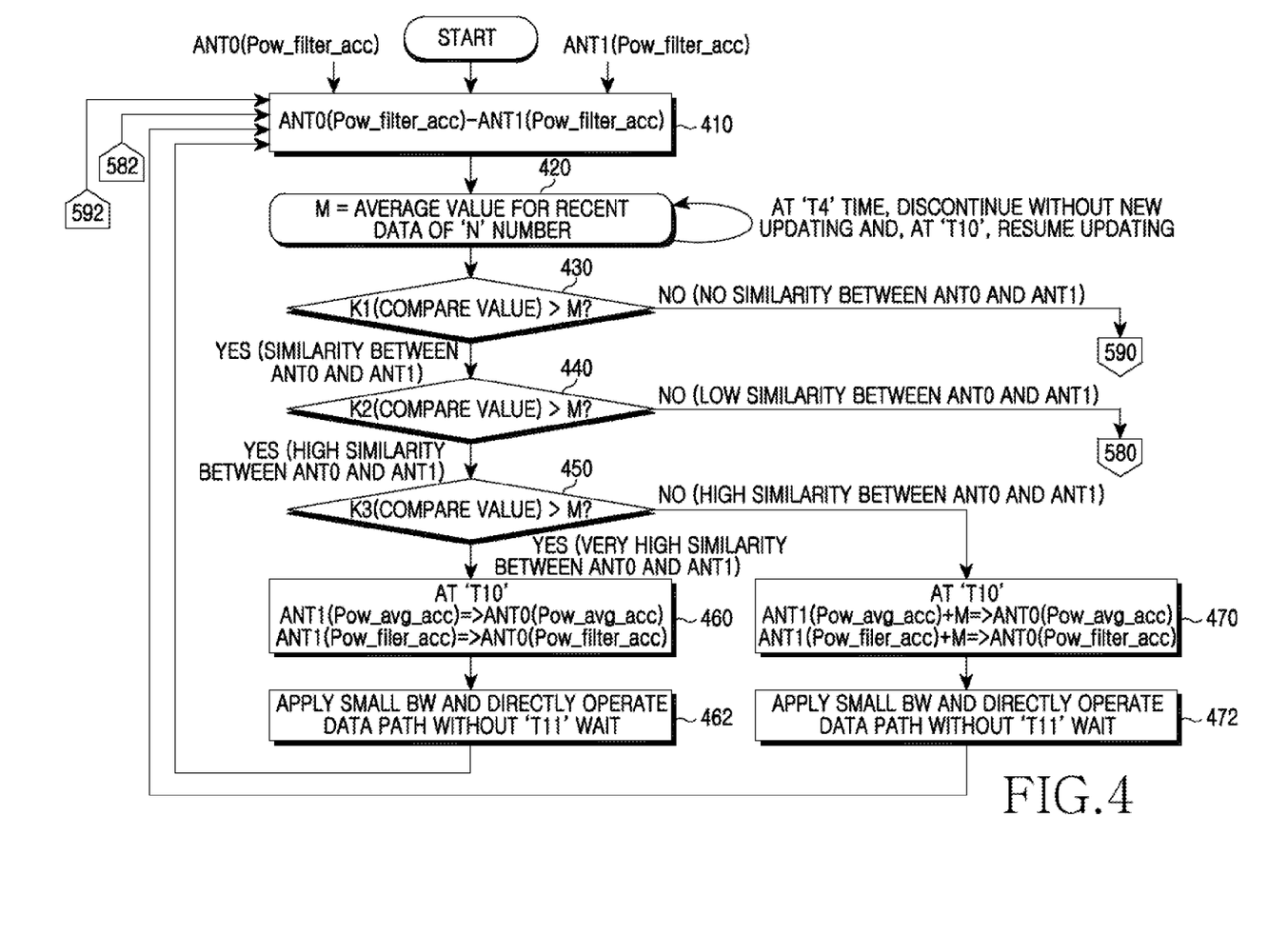
FIG. 4 is a first flow diagram illustrating an operation process of a Channel Compare unit according to an exemplary embodiment of the present invention.
Figure 5:
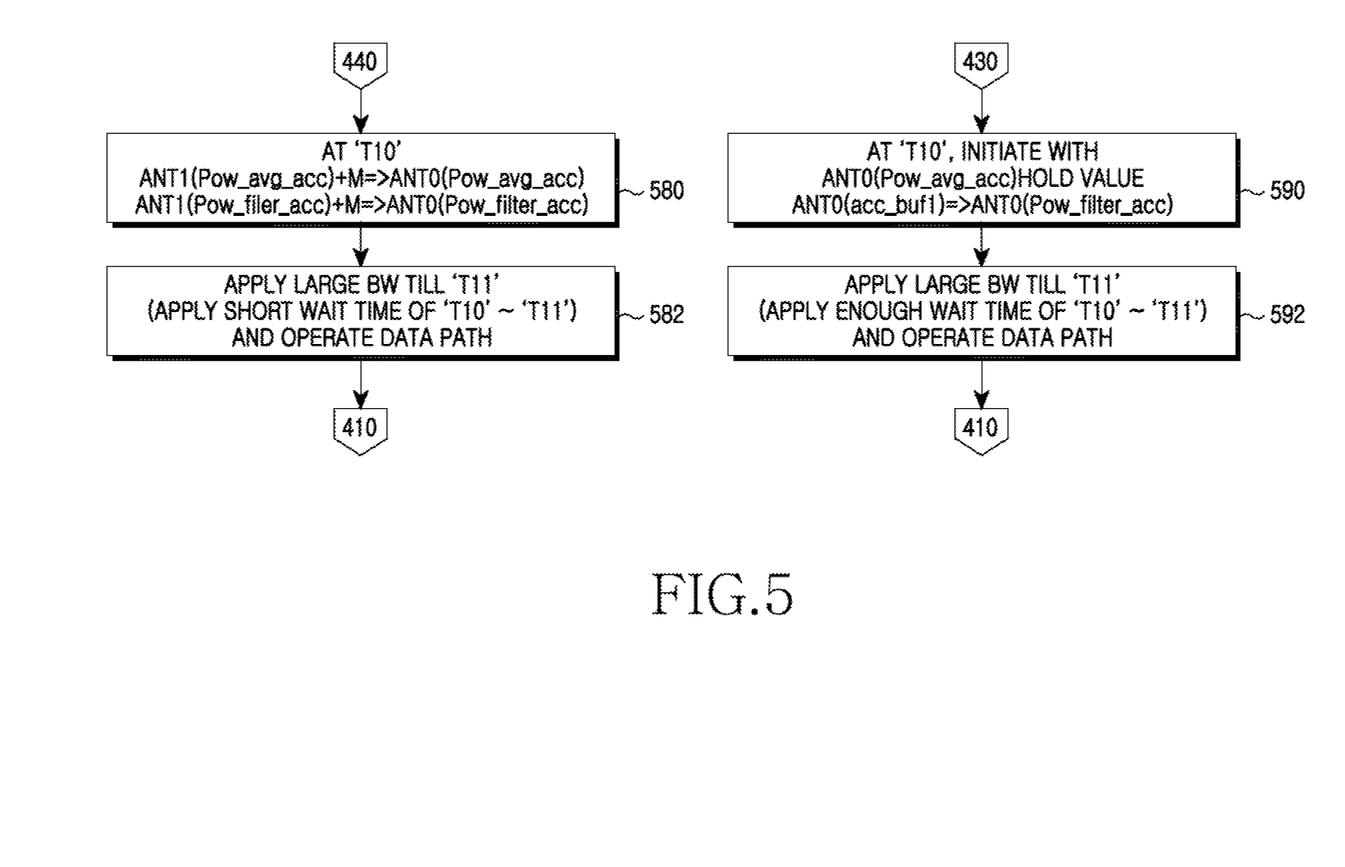
FIG. 5 is a second flow diagram illustrating an operation process of a Channel Compare unit according to an exemplary embodiment of the present invention.

The Channel Compare unit 380 exchanges information with the Power_Determine units 322 and 362 and Power_Filter units 324 and 364 of respective antennas, and controls an operation process. An operation of the Channel Compare unit 380 is described below in more detail with reference to FIGS. 4A and 4B.

FIG. 4 is a first flow diagrams illustrating an operation process of a Channel Compare unit according to an exemplary embodiment of the present invention and FIG. 5 is a second flow diagram illustrating an operation process of a Channel Compare unit according to an exemplary embodiment of the present invention.

Referring to FIGS. 4 and 5, in step 410, the Channel Compare unit receives output values (ANT0(Pow_filter_acc) and ANT1(Pow_filter_acc)) of the Power_Filter units 324 and 364 in two antenna paths (i.e., ANT0 and ANT1 paths). In step 420, the Channel Compare unit accumulates a difference (ANT0(Pow_filter_acc)–ANT1(Pow_filter_acc)) between the two output values by 'N' times, determines an average value and defines the average value as an 'M' value.

The Channel Compare unit then compares the 'M' value with compare values (K1, K2, and K3) and determines a similarity between the two output values (ANT0(Pow_filter_acc) and ANT1(Pow_filter_acc)). The compare values (K1, K2, and K3) have a size relation of K1>K2>K3. The Channel Compare unit divides the similarity into four cases (i.e., non-similarity, low similarity, high similarity and very high similarity), and performs a different control for each of the four cases.

In step 430, the first case is described as a non-similarity case where the 'M' value is compared to K1. If the K1 compare value is not greater than the 'M' value, there is no similarity between the two output values (ANT0(Pow_filter_acc) and ANT1(Pow_filter_acc)). In the non-similarity case, in step 590, the Channel Compare unit operates an accumulator at time 'T10' using a previously stored value (ANT0 (acc_buf)), as in the conventional art. In step 592, the Channel Compare unit then operates an AGC with a large BandWidth (BW) for a constant time. As illustrated in the drawings, an ANT0(Pow_avg_acc) represents the average value.

In step 440, the second case is described as a low similarity case where the 'M value is compared to K2. If the K2 compare value is not greater than the 'M' value, there is not a low similarity between the two output values (ANT0(Pow_filter_acc) and ANT1(Pow_filter_acc)). In the low similarity case, in step 580, the Channel Compare unit operates the accumulator by values determined by adding the 'M' values to current values (ANT1(Pow_avg_acc) and ANT1(Pow_filter_acc)) determined in an ANT1 at time 'T10' and correcting deviations. In step 582, the Channel Compare unit then operates the AGC with a large BW for a constant time. At this time, time 'T10' to 'T11' is a relatively shorter wait time than the case of the non-similarity.

In step 450, the third case is described as a high similarity case where the 'M' value is compared to K3. If the K3 compare value is not greater than the 'M' value, there is no high similarity between the two output values (ANT0(Pow_filter_acc) and ANT1(Pow_filter_acc)). In the high similarity case, in step 470, the Channel Compare unit operates the accumulator by values determined by adding the 'M' values to current values (ANT1(Pow_avg_acc) and ANT1(Pow_filter_acc)) determined in the ANT1 at time 'T10' and correcting deviations. In step 472, the Channel Compare unit directly operates the AGC with a small BW without operating the AGC with a large BW for a constant time. That is, the Channel Compare unit directly operates a searcher and a rake without time 'T11'.

Also, in step 450, the fourth case is described as a very high similarity case. If the K3 compare value is greater than the 'M' value, there is a very high similarity between the two output values (ANT0(Pow_filter_acc) and ANT1(Pow_filter_ acc)). In the very high similarity case, in step 460, the Channel Compare unit operates the accumulator by current values (ANT1(Pow_avg_acc) and ANT1(Pow_filter_acc)) determined in the ANT1 at time 'T10'. In step 462, the Channel Compare unit directly operates the AGC with a small BW without operating the AGC with a large BW for a constant time. That is, without time 'T11', a searcher and a rake directly start an operation.

In the case of the non-similarity, the present invention may operate substantially similar to the conventional HSPA receiver. In the case of the low similarity, the present invention may achieve AGC stabilization within a short time compared to the AGC of the conventional HSPA receiver. In the case of the high similarity, the present invention may reduce time because time 'T10' to 'T11' is unnecessary.

Figure 6:
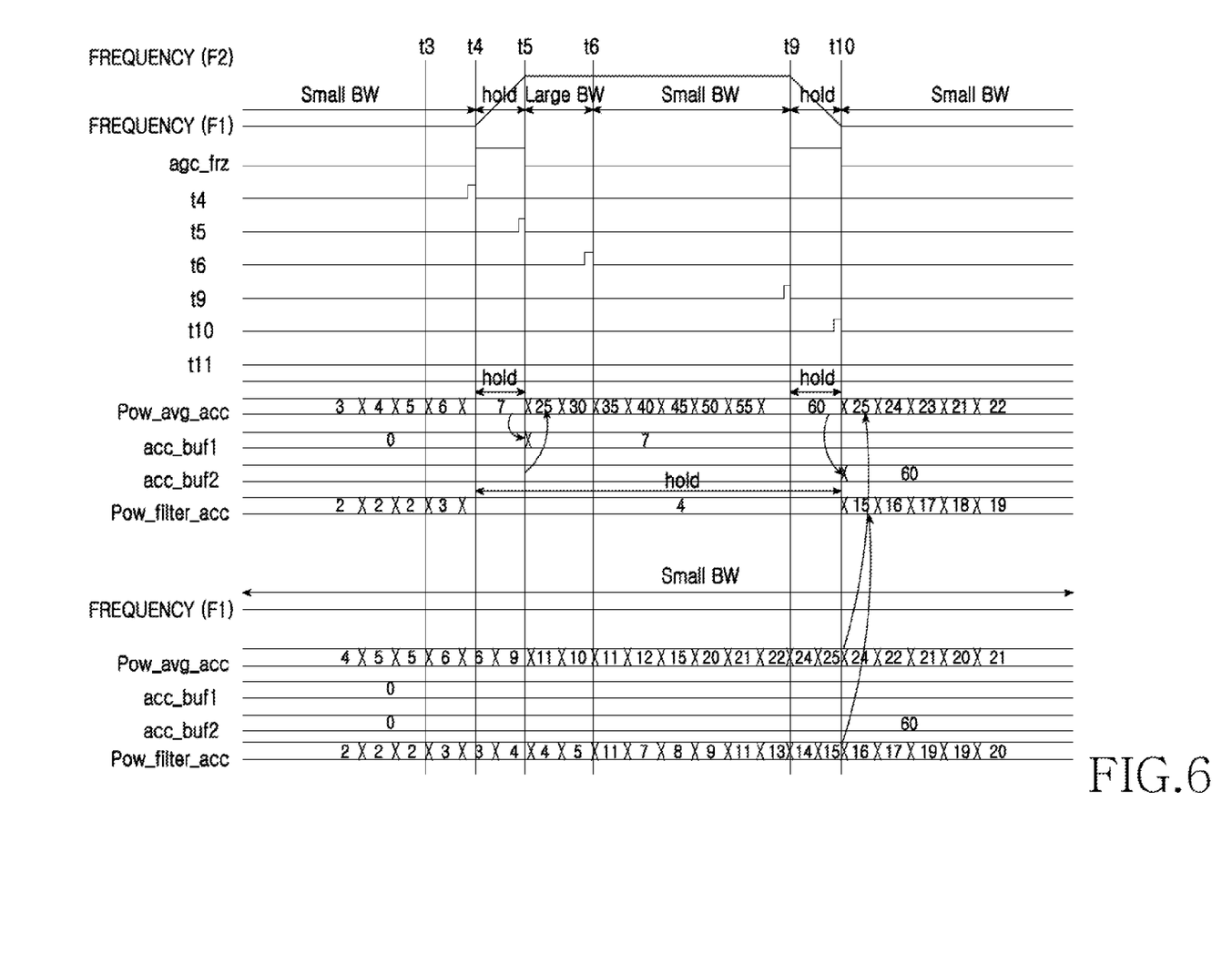
FIG. 6 is a diagram illustrating an operation when a similarity is very high in an HSPA receiver supporting MIMO according to an exemplary embodiment of the present invention; and, FIG. 7 is a graph illustrating an AGC simulation result when a similarity is very high in an HSPA receiver supporting MIMO according to an exemplary embodiment of the present invention.

FIG. 6 is a diagram illustrating an operation when a similarity is very high in an HSPA receiver supporting MIMO according to an exemplary embodiment of the present invention.

Referring to FIG. 6, if an inter-frequency determination signal is received, at time 't4', a Channel Compare unit compares an 'M' value with compare values (K1, K2, and K3) and determines a similarity. Here, a similarity is very high and an operation until time 't10' is the same as the operation of the conventional HSPA receiver.

At time 't10' when a frequency shift to the original frequency is completed, the receiver updates an accumulator of an ANT0 by a current value determined in an ANT1 and a Power_Filter unit performs updating in the same method. Without time 't10' to 't11', that is, without operating an AGC with a large BW for a constant time, the receiver directly operates the AGC with a small BW. Thus, without time 't10' to 't11', the receiver may directly operate a searcher and a rake. Here, an operation of time 't4' to 't5' represents changing a stored value of the ANT0 included in a buffer of an accumulator into the ANT1.

Figure 7:
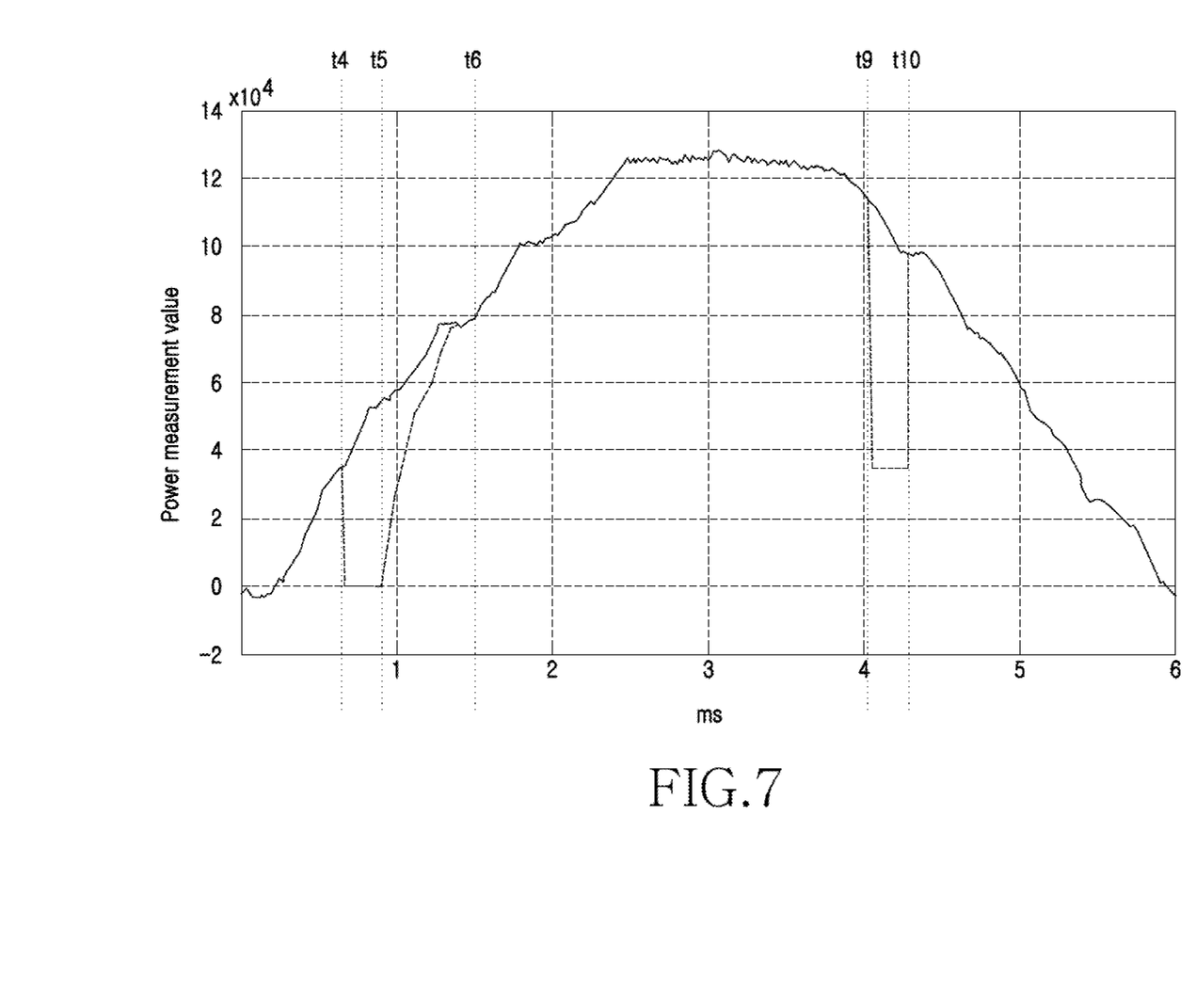

FIG. 7 is a graph illustrating an AGC simulation result when a similarity is very high in an HSPA receiver supporting MIMO according to an exemplary embodiment of the present invention.

Referring to FIG. 7, a dashed line represents an ANT1 continuously performing an AGC at the original frequency with no frequency shift. A solid line shows an AGC curve of an ANT0 performing a compressed mode operation. In the FIG. 7, it not illustrated exactly but the dashed line and the solid line are drawn together between 't6' and 't9' and between 't10' and end.

At time 't10', power determination values of the ANT0 and the ANT1 are consistent, which represents that time 't10' to 't11' is unnecessary. Therefore, the time is reduced.

Exemplary embodiments of the present invention reduce a search time using two antennas in an HSPA system supporting MIMO, upon a compressed mode operation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for Automatic Gain Control (AGC) during a compressed mode search in a Multiple Input Multiple Output (MIMO) system, the method comprising:
   simultaneously determining power at a first frequency band using a first receiver connected to a first antenna and determining power at a second frequency band using a second receiver connected to a second antenna, the second receiver being in a compressed mode;
   when the second receiver changes from receiving the second frequency band to receiving the first frequency band, correcting the power determined at the first frequency band using the first receiver; and
   applying the corrected power determined at the first frequency band using the first receiver to the second receiver,
   wherein the correcting of the power determined at the first frequency band using the first receiver comprises:
   determining an average value of the power determined at the first frequency band using the first receiver of a predefined number of times and the power determined at the second frequency band using the second receiver of a predefined number of times;
   comparing the average value with at least one predefined threshold value; and
   based on the comparison result, correcting the power determined at the first frequency band using the first receiver.

2. The method of claim 1, wherein the correcting of the power determined at the first frequency band using the first receiver based on the comparison result, comprises:
   determining if the average value is positioned within a range of the at least one predefined threshold value;
   based on the position of the average value, determining a similarity between the at least one predefined threshold value and the average value; and correcting the power determined at the first frequency band using the first receiver using a correction value based on the similarity.

3. The method of claim 2, wherein the similarity comprises at least one of a non-similarity, a low similarity, a high similarity and a very high similarity.

4. The method of claim 3, wherein the applying of the corrected power determined at the first frequency band using the first receiver to the second receiver comprises:
   inputting the corrected power determined at the first frequency band using the first receiver to the second receiver; and
   operating the AGC with at least one of a large BandWidth (BW) and a small BW based on the similarity.

5. The method of claim 4, wherein the AGC operates with a large BW for a constant time when the similarity is the non-similarity.

6. The method of claim 4, wherein the AGC operates with a large BW for a constant time when the similarity is the low similarity.

7. The method of claim 4, wherein the AGC operates with a small BW for a constant time when the similarity is the high similarity.

8. The method of claim 4, wherein the AGC operates with a small BW for a constant time when the similarity is the very high similarity.

9. An apparatus for Automatic Gain Control (AGC) during a compressed mode search in a Multiple Input Multiple Output (MIMO) system, the apparatus comprising:
   a first receiver, connected to a first antenna, for determining power at a first frequency band;
   a second receiver, connected to a second antenna, for, in a compressed mode, simultaneously to the first receiver determining power at the first frequency band, determining power at a second frequency band; and
   a channel comparator for correcting the power determined at the first frequency band using the first receiver when the second receiver changes from receiving the second frequency band to receiving the first frequency band, and for applying the corrected power determined at the first frequency band using the first receiver to the second receiver,
wherein the channel comparator:
   determines an average value of the power determined at the first frequency band using the first receiver of a predefined number of times and the power determined at the second frequency band using the second receiver of a predefined number of times;
   compares the average value with at least one predefined threshold value; and
   corrects the power determined at the first frequency band using the first receiver based on the comparison result.

10. The apparatus of claim 9, wherein the channel comparator:
   determines if the average value is positioned within a range of the at least one predefined threshold value;
   based on the position of the average value, determines a similarity between the at least one predefined threshold value and the average value; and
   corrects the power determined at the first frequency band using the first receiver using a correction value based on the similarity.

11. The apparatus of claim 10, wherein the similarity comprises at least one of a non-similarity, a low similarity, a high similarity and a very high similarity.

12. The apparatus of claim 11, wherein the channel comparator:
   inputs the corrected power determined at the first frequency band using the first receiver to the second receiver; and
   operates the AGC with at least one of a large BW and a small BW based on the similarity.

13. The apparatus of claim 12, wherein the AGC operates with a large BW for a constant time when the similarity is the non-similarity.

14. The apparatus of claim 12, wherein the AGC operates with a large BW for a constant time when the similarity is the low similarity.

15. The apparatus of claim 12, wherein the AGC operates with a small BW for a constant time when the similarity is the high similarity.

16. The apparatus of claim 12, wherein the AGC operates with a small BW for a constant time when the similarity is the very high similarity.

* * * * *